(12) United States Patent
Kim et al.

(10) Patent No.: US 10,314,454 B2
(45) Date of Patent: Jun. 11, 2019

(54) MOVING ROBOT AND CONTROL METHOD THEREOF

(71) Applicant: LG ELECTRONICS INC., Seoul (KR)

(72) Inventors: Hwang Kim, Seoul (KR); Sungil Park, Seoul (KR); Soohyun Kim, Daejeon (KR); Byungho Yoon, Daejeon (KR); Sanghoon Han, Daejeon (KR); Youngjun Jeon, Daejeon (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 15/436,093

(22) Filed: Feb. 17, 2017

(65) Prior Publication Data

US 2017/0238778 A1 Aug. 24, 2017

(30) Foreign Application Priority Data

Feb. 22, 2016 (KR) .................. 10-2016-0020787

(51) Int. Cl.
*A47L 9/28* (2006.01)
*A47L 9/00* (2006.01)
(Continued)

(52) U.S. Cl.
CPC ............. *A47L 9/2852* (2013.01); *A47L 9/009* (2013.01); *A47L 9/2805* (2013.01);
(Continued)

(58) Field of Classification Search
CPC ...... A47L 9/009; A47L 9/2805; A47L 9/2852; A47L 9/2857; A47L 9/2873; A47L 9/2884; A47L 9/2894; A47L 2201/022; B25J 13/085; B62D 61/12
See application file for complete search history.

(56) References Cited

U.S. PATENT DOCUMENTS

2008/0039974 A1* 2/2008 Sandin ................. G05D 1/0225
700/258
2013/0081218 A1* 4/2013 Kim ........................ A47L 9/009
15/21.1
(Continued)

FOREIGN PATENT DOCUMENTS

CN 202201081 4/2012
EP 2 732 939 5/2014
(Continued)

OTHER PUBLICATIONS

Korean Office Action dated Nov. 16, 2016 issued in Application No. 10-2016-0020787.
(Continued)

*Primary Examiner* — Rachid Bendidi
(74) *Attorney, Agent, or Firm* — KED & Associates, LLP

(57) ABSTRACT

A moving robot includes a main body, a drive assembly moving the main body, and a cleaner head performing cleaning on a cleaning area in which the main body is positioned, wherein the drive assembly includes a main wheel, a motor generating a driving force, a gear box connected to the main wheel and the motor and transferring the driving force from the motor to the main wheel, and a leg member disposed on a shaft connecting the main wheel and the gear box and providing thrust independently of the main wheel.

11 Claims, 11 Drawing Sheets

(51) Int. Cl.
    *B25J 13/08*    (2006.01)
    *B62D 61/12*    (2006.01)
(52) U.S. Cl.
    CPC ........... *A47L 9/2857* (2013.01); *A47L 9/2873* (2013.01); *A47L 9/2884* (2013.01); *A47L 9/2894* (2013.01); *B25J 13/085* (2013.01); *B62D 61/12* (2013.01); *A47L 2201/022* (2013.01); *A47L 2201/04* (2013.01)

(56) References Cited

U.S. PATENT DOCUMENTS

| | | | |
|---|---|---|---|
| 2014/0145495 A1* | 5/2014 | Shin | B25J 5/007 |
| | | | 301/6.5 |
| 2016/0007817 A1* | 1/2016 | Schlischka | A47L 11/4061 |
| | | | 280/5.514 |
| 2016/0015232 A1 | 1/2016 | Nakamura et al. | |

FOREIGN PATENT DOCUMENTS

| | | |
|---|---|---|
| KR | 10-2015-0048488 | 5/2015 |
| KR | 10-2015-0065134 | 6/2015 |

OTHER PUBLICATIONS

European Search Report dated Mar. 2, 2018 issued in Application No. 17195431.6.
European Search Report dated Jul. 24, 2017 issued in Application No. 17157382.7.

* cited by examiner

MOVING ROBOT AND CONTROL METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2016-0020787, filed in Korea on Feb. 22, 2016, the contents of which is incorporated by reference herein in its entirety.

BACKGROUND

1. Field

The present disclosure relates to a moving robot and a control method thereof, and particularly, to a moving robot capable of overcoming a wheel arrest phenomenon and a control method thereof.

2. Background

In general, robots have been developed for industrial purposes and have been in charge of part of factory automation. Recently, robot-applied fields have further extended to develop medical robots or aerospace robots, and home robots that may be used in general houses have also been made.

A typical example of a home robot is a robot cleaner, which may be a home appliance that cleans by sucking ambient dust or foreign objects, while traveling in a predetermined area. Such a robot cleaner may include a generally rechargeable battery and have an obstacle sensor capable of avoiding an obstacle during traveling so that the robot cleaner may perform cleaning while traveling.

Recently, beyond performing cleaning while robot cleaners are simply autonomously traveling in a cleaning area, research into utilization of robot cleaners in various fields such as healthcare, smart home, remote control, and the like, has been actively conducted. When a robot cleaner performs autonomous traveling in a cleaning area, the robot may meet various obstacles present in the cleaning area, and thus, an algorithm for avoiding such obstacles when performing autonomous traveling and cleaning operation may be required.

However, when a bottom surface of the cleaning area is not even, if all surface portions which are not even are recognized as obstacles, a cleaning range may be reduced, and thus, a recognition reference related to an obstacle may not be set too strictly. Thus, when the robot cleaner passes through a portion of the bottom surface without recognizing an uneven portion of the bottom surface as an obstacle, at least one of a plurality of wheels may not come into contact with the bottom surface, generating idle rotation, making it impossible for the robot cleaner to normally travel.

Also, when at least one of the plurality of wheels of the robot cleaner is completely arrested, the arrested state of the wheel may not be released only by an output from a motor. Thus, a robot cleaner that solves an idle rotation phenomenon and a complete arrest phenomenon of the wheel that may occur when the robot cleaner passes on bottom surfaces of various conditions and a control method thereof may be required. That is, a robot cleaner which may avoid the idle rotation phenomenon or complete arrest phenomenon and a control method thereof may be required.

Korean Patent Laid-Open Publication No. 10-2015-0065134 discloses a cleaning robot capable of detecting a stuck state such as a state in which the cleaning robot is caught (catching phenomenon) or lifted (lifting phenomenon) or an object stuck phenomenon, and the like, at the time of traveling. However, the related art cleaning robot may not be able to solve the catching, lifting or object-stuck phenomenon, and may require a sub-wheel installed to correspond to a main wheel and a separate motor moving the sub-wheel in the stuck state. Thus, manufacturing cost of a robot may be increased to install the sub-wheel and the motor for moving a position of the sub-wheel, and since separate electric power is required to be supplied to the separate motor to move the sub-wheel, efficiency of power consumed in the robot may be reduced.

The addition of the sub-wheel may increase a weight of the robot body, causing user inconvenience. Also, when the related art robot overpasses an obstacle, only power transmitted to the sub-wheel may be used and idle-rotation may still occur in the main wheel. The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
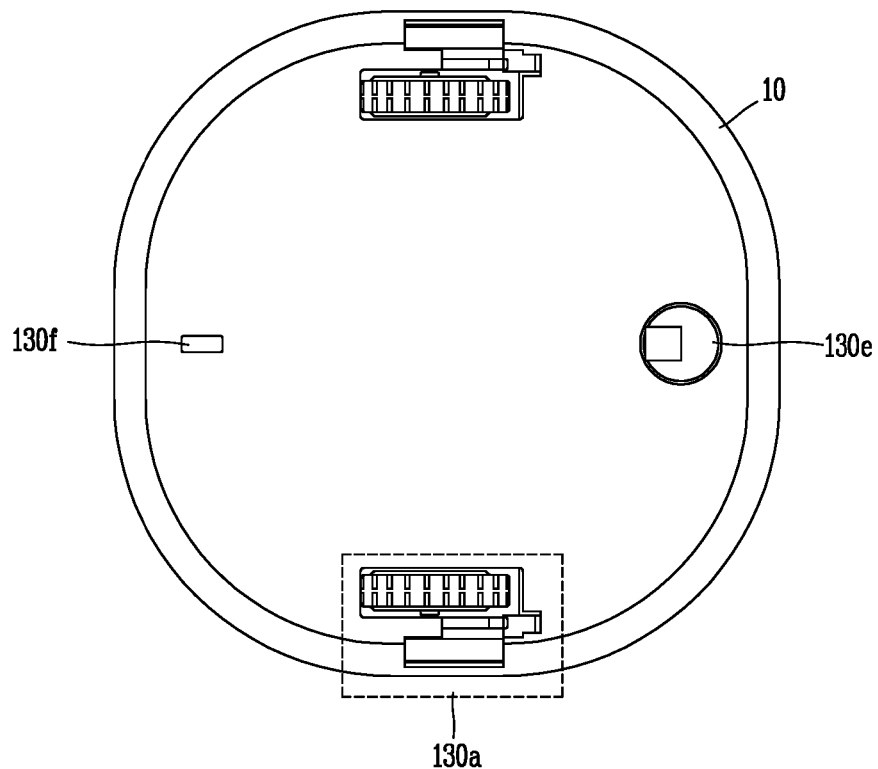
FIG. 1A is a conceptual view illustrating a rear surface of a moving robot according to an embodiment of the present disclosure.
Figure 1B:
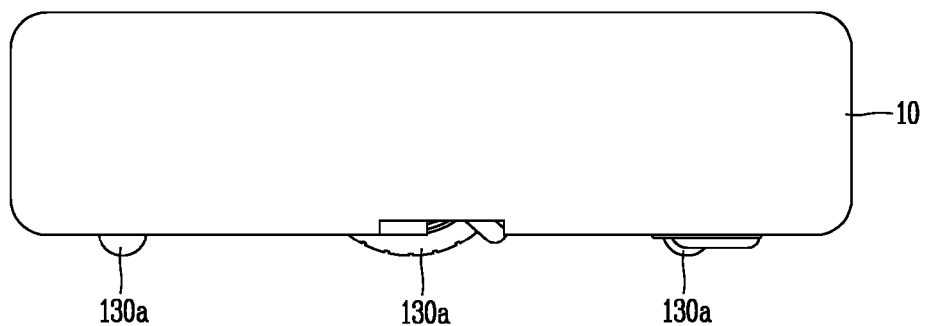
FIG. 1B is a conceptual view illustrating a side surface of a moving robot according to an embodiment of the present disclosure.

Referring to FIGS. 1A and 1B, a moving robot 100 may include a main body 10 prepared to be movable. For example, when the moving robot 100 is a robot cleaner, the main body 10 may include a cleaning unit (or vacuum) generating a suction force.

A driving unit capable of moving the main body 10 in a desired direction and rotating the main body 10 may be provided in the main body 10. The driving unit may include a plurality of rotatable wheels, and each of the wheels may be separately rotated and the main body 10 may be rotated in a desired direction. In detail, the driving unit may include at least one main driving wheel 130a and auxiliary wheels 130e and 130f. For example, the main body 10 may include two main driving wheels 130a, and the main driving wheels may be installed on a lower surface of the main body 10.

Figure 1C:
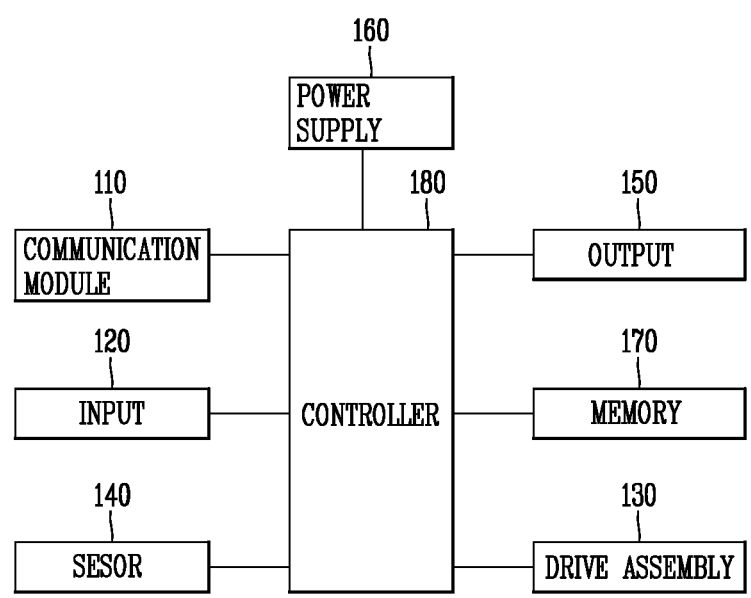
FIG. 1C is a block diagram illustrating components of a moving robot according to an embodiment of the present disclosure.

As illustrated in FIG. 1C, a moving robot according to an embodiment of the present disclosure may include at least one of a communication unit or module 110, an input unit (or input) 120, a driving unit (or drive) 130, a sensing unit (or sensor) 140, an output unit (or output) 150, a power supply unit (or power supply) 160, a memory 170, and a controller 180, and a combination thereof. The components illustrated in FIG. 1C are not essential and a robot cleaner having fewer or greater components may be implemented. Hereinafter, the components will be described.

The power supply unit 160 may include a battery that can be charged by an external commercial power source and supplies power to the moving robot. The power supply unit 160 may supply driving power to each component included in the moving robot to supply operation power required for the moving robot to travel or perform a specific function.

The controller 180 may sense a remaining power capacity of the battery, and when the remaining power capacity is insufficient, the controller 180 may control the moving robot to move to a charging station connected to an external commercial power source and charge the battery upon receiving a charge current from the charging station. The battery may be connected to a battery sensing unit (or battery sensor) and a remaining battery capacity and a charge state may be transferred to the controller 180. The output unit 150 may display a remaining battery capacity on a screen by the controller.

The battery may be positioned at or in a lower portion of the center of the robot cleaner or may be positioned on any one of left and right sides of the robot cleaner. In the latter case, the moving robot may further include a balance weight to resolve bias in weight of the battery.

The driving unit 130 may include a motor and drive the motor to rotate left and right main wheels of the main body of the moving robot in both directions to rotate or move the main body. The driving unit 130 may move the main body of the moving robot forwards/backwards and leftwards/rightwards, or enable the main body of the moving robot to travel in a curved manner or rotate in place.

The input unit 120 may receive various control commands regarding the robot cleaner from a user. The input unit 120 may include one or more buttons, for example, an OK button, a setting button, and the like. The OK button may receive a command to check detection information, obstacle information, position information, and map information from the user, and the setting button may receive a command to set the aforementioned types of information from the user.

The input unit 120 may include an input resetting button to cancel a previous user input and receive a user input again, a delete button to delete a preset user input, a button to set or change an operation mode, or a button to receive a command to return to the charging station. The input unit 120 may be installed in an upper portion of the moving robot, as a hard key, a soft key, or a touch pad. The input unit 120 may have a form of a touch screen together with the output unit 150.

Meanwhile, the output unit 150 may be installed in or at an upper portion of the moving robot. An installation position or an installation form thereof may be varied. For example, the output unit 150 may display a battery state or a traveling scheme.

The output unit 150 may output information regarding a state of an interior of the moving robot detected by the sensor 140, for example, a current state of each component included in the moving robot. The output unit 150 may display external state information, obstacle information, position information, and map information detected by the sensor 140 on a screen. The output unit 150 may be configured as at least one device among a light emitting diode (LED), a liquid crystal display (LCD), a plasma display panel (PDP), an organic light emitting diode (OLED).

The output unit 150 may further include a sound output unit (or sound output) audibly outputting an operational process or an operation result of the moving robot performed by the controller 180. For example, the output unit 150 may output a warning sound outwardly according to a warning signal generated by the controller 180.

The sound output unit may output a sound, such as a beeper, a speaker, and the like, and the output unit 150 may output audio data or message data having a predetermined pattern stored in the memory 170 through the sound output unit. Thus, the moving robot according to an embodiment may output environment information regarding a traveling region on a screen or output it as a sound through the output unit 150. Also, according to another embodiment, the moving robot may transmit map information or environment information to a terminal device through the communication unit 110 such that the terminal device may output a screen or a sound to be output through the output unit 150.

The communication unit 110 may be connected to the terminal device and/or a different device positioned within a specific region (which will be used together with a "home appliance" in this disclosure) according to one communication scheme among wired, wireless, and satellite communication schemes to transmit and receive data. The communication unit 110 may transmit and receive data to and from a different device positioned within a specific region. Here, the different device may be any device as long as it can be connected to a network and transmit and receive data. For example, the different device may be an air-conditioner, a heating device, an air purifier, a lamp, a TV, an automobile, and the like. The different device may also be a sensor sensing a temperature, humidity, atmospheric pressure, a gas, and the like.

Meanwhile, the memory 170 may store a control program controlling or driving the robot cleaner and data corresponding thereto. The memory 170 may store audio information, image information, obstacle information, position information, map information, and the like. Also, the memory 170 may store information related to a traveling pattern.

As the memory 170, a non-volatile memory may be commonly used. Here, the non-volatile memory (NVM) (or NVRAM) may be capable of continuously maintaining stored information even though power is not applied thereto. For example, the memory 170 may be a ROM, a flash memory, a magnetic computer storage device (for example, a hard disk or a magnetic tape), an optical disk drive, a magnetic RAM, a PRAM, and the like.

The sensor 140 may include at least one of an external signal sensor, a front sensor, and a cliff sensor. The external signal sensor may sense an external signal of the moving robot. The external signal sensor may be, for example, an infrared sensor, an ultrasonic sensor, an RF sensor, or the like.

The moving robot may check a position and a direction of the charging station upon receiving a guide signal generated by the charging station using the external signal sensor. The charging station may transmit the guide signal indicating a direction and a distance such that the moving robot may be returned. Upon receiving the signal transmitted from the charging station, the moving robot may determine a current position and set a movement direction to return to the charging station.

The front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 180. The front sensor may sense a protrusion present in a movement path of the moving robot, furnishings, furniture, a wall surface, a wall corner, or the like, in a house, and transmit corresponding information to the controller 180.

The front sensor may be, for example, an infrared sensor, an ultrasonic sensor, an RF sensor, a geomagnetic sensor, or the like, and the moving robot may use a type of sensor or two or more types of sensors together as the front sensor. For example, in general, the ultrasonic sensor may be mainly used to sense an obstacle in a remote area. The ultrasonic sensor may include a transmission unit or module and a reception unit or module. The controller 180 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

The controller 180 may detect information related to a size of an obstacle by comparing an ultrasonic wave radiated from the transmission unit and an ultrasonic wave received by the reception unit. For example, as a larger amount of ultrasonic waves is received by the reception unit, the controller 180 may determine that the size of the obstacle is larger.

In an embodiment, a plurality of ultrasonic sensors (for example, five ultrasonic sensors) may be installed on an outer circumferential surface of a front side of the moving robot. Preferably, the transmission units and the reception units of the ultrasonic sensors may be installed alternately on the front side of the moving robot.

The transmission units may be spaced apart from the center of the front side of the main body of the moving robot, and in this case, one or two or more transmission units may be positioned between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

The ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided. As mentioned above, two or more types of sensors may be used as the front sensors, and thus, one or more types of sensor among an infrared sensor, an ultrasonic sensor, and an RF sensor may be used as the front sensors. The front sensor may include an infrared sensor as a different type of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 180. The infrared sensor may sense a protrusion present in a movement path of the moving robot, furnishings, furniture, a wall surface, a wall corner, and the like, in a house, and transmit corresponding information to the controller 180. Thus, the moving robot may move within a cleaning area without colliding with an obstacle.

As the cliff sensor, various types of optical sensors may be used, and the cliff sensor may sense an obstacle of the floor supporting the main body of the moving robot. The cliff sensor may be installed on a rear surface of the moving robot 100 and may be installed in different regions depending on a type of a moving robot. The cliff sensor may be positioned on a rear surface of the moving robot to sense an obstacle on the floor. The cliff sensor may be an infrared sensor including a light emitting unit or device and a light receiving unit or module, an ultrasonic sensor, an RF signal, a position sensitive detector (PSD) sensor, or the like, like the obstacle sensor.

Any one of cliff sensors may be installed on the front side of the moving robot, and the other two cliff sensors may be installed on a rear side. The cliff sensor may be a PSD sensor or may include a plurality of different types of sensor.

The PSD sensor may detect the positions of the short and long distances of an incident light with a single p-n junction by using the surface resistance of a semiconductor. The PSD sensor may include a 1D PSD sensor that detects light on a single axis and a 2D PSD sensor that may detect the position of light on the surface, and each may have a pin photodiode structure. The PSD sensor may be a type of infrared sensor which transmits an infrared ray to an obstacle and measures an angle between the infrared ray transmitted to the obstacle and infrared ray returned after being reflected from the obstacle, thus measuring a distance therebetween. The PSD sensor may calculate a distance to the obstacle using triangulation.

The PSD sensor may include a light emitting unit emitting infrared light to an obstacle and a light receiving unit receiving infrared light returned after being reflected from the obstacle. In general, the PSD sensor may be a module. In a case in which an obstacle is sensed by using the PSD sensor, a stable measurement value may be obtained regardless of difference in reflectivity or color of the obstacle. The controller 180 may measure an angle between an infrared light emitting signal irradiated by the cliff sensor toward the floor and a reflection signal received after being reflected from the obstacle to sense a cliff, and analyze a depth thereof.

The controller 180 may determine whether the moving robot may be able to pass through a cliff according to a floor state of the cliff sensed by using the cliff sensor. For example, the controller 180 may determine whether a cliff is present and a depth of the cliff through the cliff sensor and only when a reflection signal is sensed by the cliff sensor, the controller 180 may allow the moving robot to pass through the cliff. In another example, the controller 180 may determine whether the moving robot is lifted using the cliff sensor.

A lower camera sensor may be provided on a rear surface of the moving robot and obtain image information regarding a lower side, namely, the floor (or a surface to be cleaned) during movement. The lower camera sensor provided on the rear surface may be defined as a lower camera sensor and may also be called an optical flow sensor. The lower camera sensor may convert an image of the lower side input from an image sensor provided therein to generate a predetermined format of image data. The generated image data may be stored in the memory 170.

One or more light sources may be installed to be adjacent to an image sensor. One or more light sources may irradiate light to a predetermined region of the floor captured by the image sensor. Namely, in a case in which the moving robot moves a cleaning region along the floor, when the floor is smooth, a predetermined distance may be maintained between the image sensor and the floor. On the other hand, in a case in which the moving robot moves on a floor which is uneven, the image sensor may become away from the floor by a predetermined distance or greater due to depressions and protrusions and an obstacle of the floor. In this case, the one or more light sources may be controlled by the controller 180 such that an amount of irradiated light can be adjusted. The light sources may be a light emitting device, for example, a light emitting diode (LED), or the like, whose amount of light can be adjusted.

The controller 180 may detect a position of the moving robot regardless of whether the moving robot slides by using the lower camera sensor. The controller 180 may compare and analyze image data captured by the lower camera sensor over time to calculate a movement distance and a movement direction, and calculate a position of the moving robot on the basis of the calculated movement distance and the movement direction. By using the image information regarding the lower side of the moving robot using the lower camera sensor, the controller 180 may perform correction resistant to sliding with respect to a position of the moving robot calculated by other means.

An upper camera sensor may be installed to face an upper side or a front side of the moving robot to capture images around the moving robot. When the moving robot includes a plurality of camera sensors, the camera sensors may be formed at or in an upper portion or on a side surface of the moving robot at a predetermined distance or at a predetermined angle.

Meanwhile the upper camera sensor may face an upper side or front side of the moving robot to capture an image around the moving robot. When the moving robot has a plurality of upper camera sensors, the camera sensors may be provided on an upper portion or a side surface of the moving robot at a predetermined distance or at a predetermined angle.

Figure 2A:
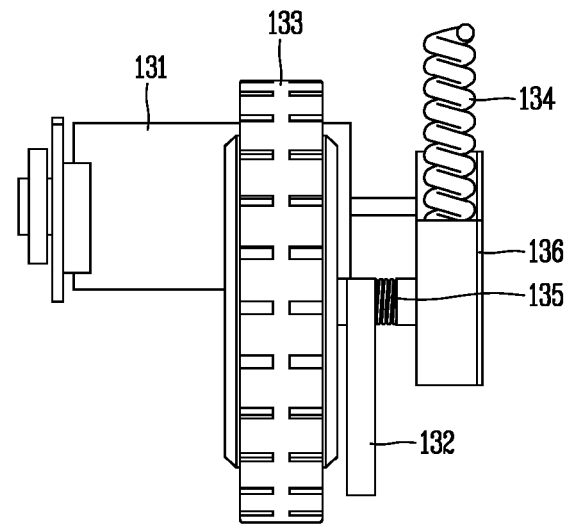
FIGS. 2A and 2B are conceptual views illustrating a driving unit of a moving robot according to an embodiment of the present disclosure.
Figure 2B:
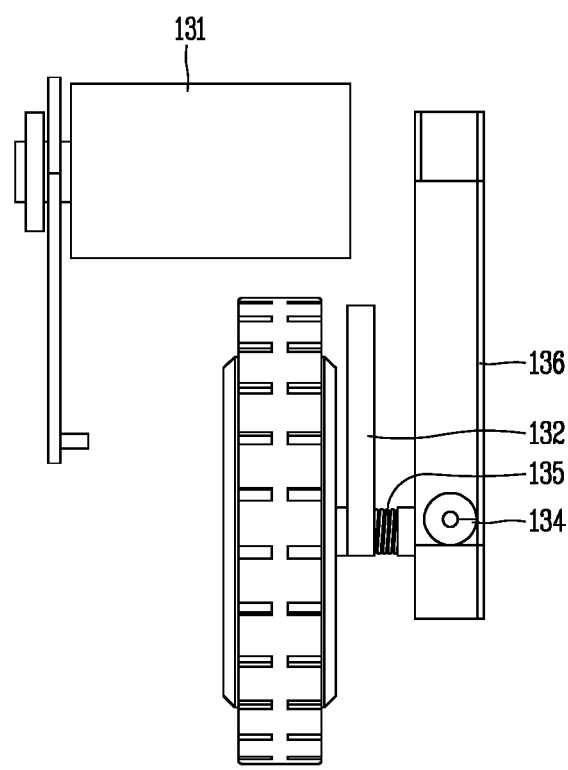

As illustrated in FIG. 2A, the driving unit 130 may include at least one of a trust providing leg member (or leg) 132, a main wheel 133, a spring member (or spring) 134, an elastic member (or spring) 135, and a gear unit (or gear box) 136. In detail, the main wheel 133 may have a circular shape and may have a plurality of recesses formed on an outer surface thereof. A hole may be provided in a central portion of the main wheel 133.

The motor 131 may generate a driving force, and the main wheel 133 may receive driving force generated by the motor 131 through the gear unit 136. The leg member 132 may have a bar shape, and may be longer than a radius of the main wheel 133. A hole substantially corresponding to the hole formed in the main wheel 133 may be formed in a portion of the leg member 132. Accordingly, the leg member 132 and the main wheel 133 may be installed on the same shaft, and in this case, one end of the leg member 132 may be away from the same shaft farther than an outer circumferential surface of the main wheel 133.

Figure 2C:
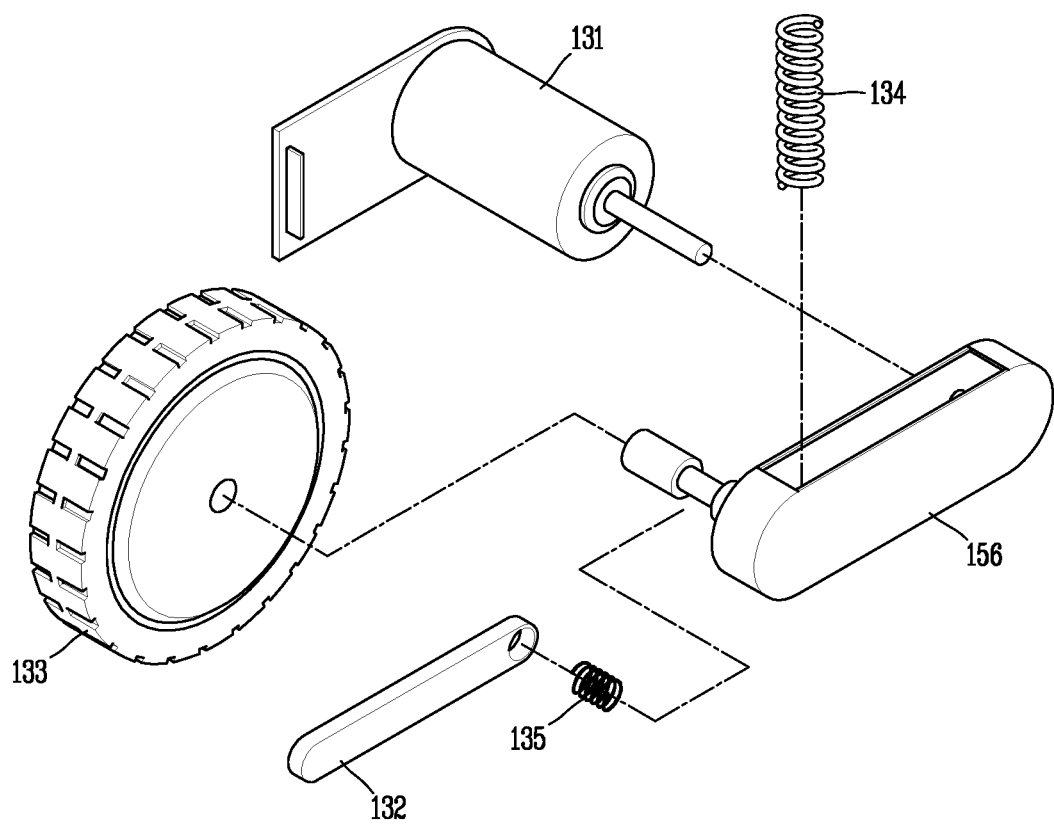
FIG. 2C is an exploded perspective view illustrating the driving unit of FIG. 2B.

Thus, even when the main wheel 133 is idly rotated or completely arrested by an obstacle, the leg member 132 may provide thrust independently of the main wheel 133 to the moving robot such that the main body of the moving robot may be spurred to move on the floor or overcome the obstacle. The leg member 132 may be a thrust providing member providing separate thrust to recover to robot in a state of being arrested by the obstacle, a deadlock state, or a state in which the main driving wheel is in an idle rotation state to a normal state. When the main wheel 133 is idly rotated or arrested by an obstacle, the leg member 132 may be rotated. Referring to FIG. 2C, the leg member 132 may have a rod shape, and a first end of the leg member 132 may have a gentle curved surface. Although not shown in FIG. 2C, a buffer member may be attached to the first end portion of the leg member 132 farther than the outer circumferential surface of the main wheel 133. Thus, when the leg member 132 provides thrust to a floor surface or an obstacle, independently of the main wheel, damage to one end portion of the leg member 132 may be prevented.

The leg member 132 may be formed of a material different from that of an outer circumferential surface of the main wheel 133. A coefficient of friction of an outer surface of the first end of the leg member 132 may be higher than that of the outer circumferential surface of the main wheel 133.

The gear unit 136 may be connected to the main wheel 133 and the motor 131 and transfer driving force from the motor 131 to the main wheel 133. The leg member 132 may be provided on an axis connecting the main wheel 133 and the gear unit 136. The gear unit 136 may include a shaft connected to each of the motor 131 and the main wheel 133, and a plurality of gears may be installed to be engaged with each other within the gear unit 136 and transfer driving force generated in the motor 131 to the main wheel 133.

The spring member 134 may be coupled to the gear unit 136 and the main body of the robot. The spring member 134 may couple the driving unit 130 to the main body of the robot and may serve to buffer an external impact. The elastic member 135 may be provided between the leg member 132 and the gear unit 136. In detail, referring to FIG. 2C, the elastic member 135 may be installed on an axis connecting the gear unit 136 and the main wheel 133. Like the main wheel 133 and the leg member 132, the elastic member 135 may have a hole and may be inserted into a driving shaft connecting the main wheel 133 and the gear unit 136.

Figure 2D:
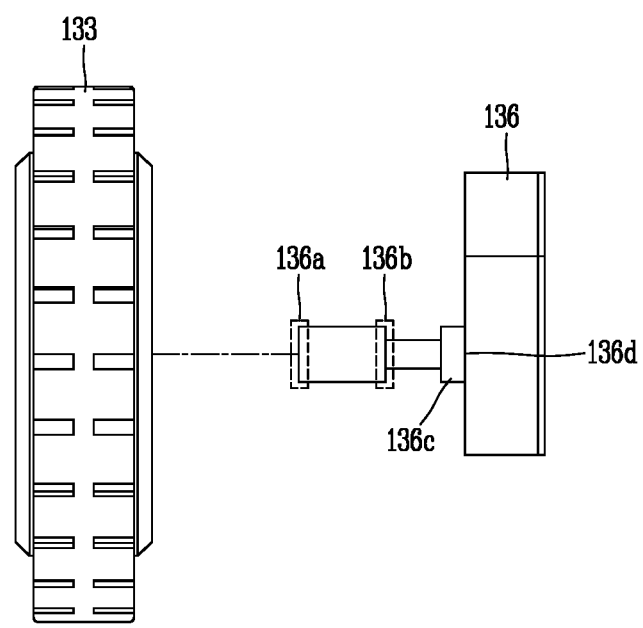
FIG. 2D is a conceptual view specifically illustrating the driving unit of a robot cleaner illustrated in FIG. 2C.

Referring to FIG. 2D, a wheel fastening member may be formed in a first portion 136a of the driving shaft. The wheel fastening member may fasten the driving shaft and the main wheel 133 as one rigid body.

A first coupling member (or first coupler) coupling the main wheel 133 and the leg member 132 may be formed in a second portion 136b of the driving shaft, and a second coupling member (or second coupler) coupling the leg member 132 and a portion of the gear unit 136 may be formed in a third portion 136c.

An elastic member fastening portion may be formed in a fourth portion 136d of the driving shaft. Thus, one end of the elastic member 135 may be formed as one rigid body with a portion of the gear unit 136.

Figure 3A:
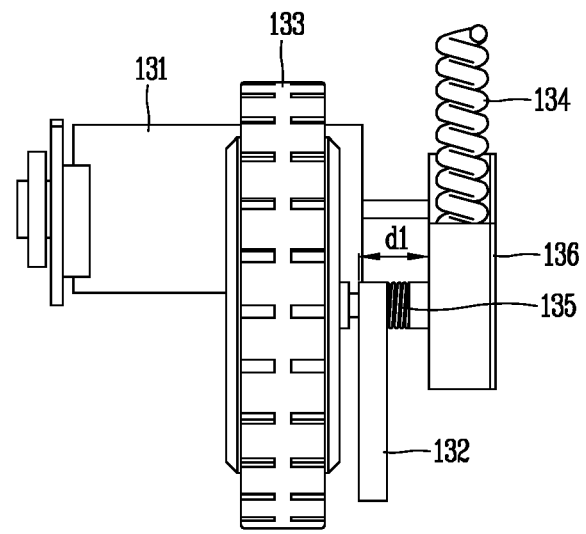
FIGS. 3A to 3C are conceptual views illustrating an operation of the driving unit according to a traveling state, a completely arrested state, and an idle state of a moving robot according to an embodiment of the present disclosure.
Figure 3B:
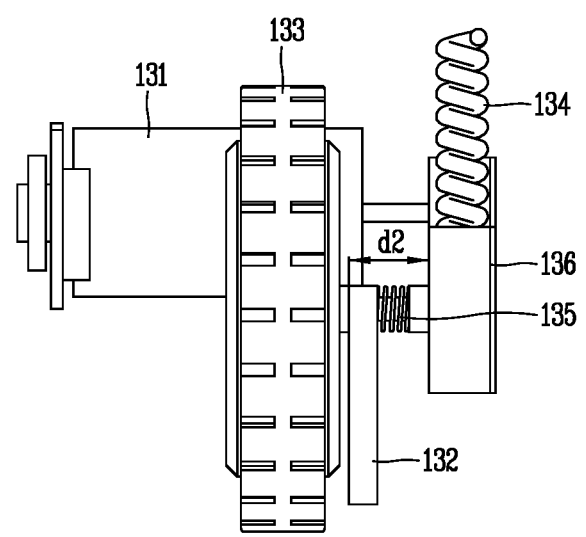
Figure 3C:
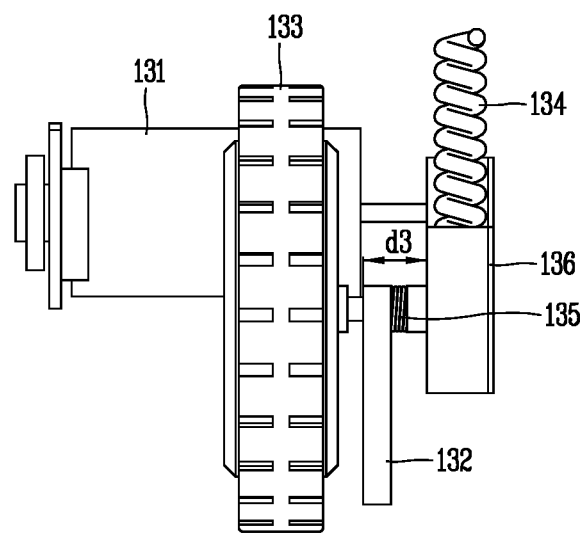
Figure 4A:
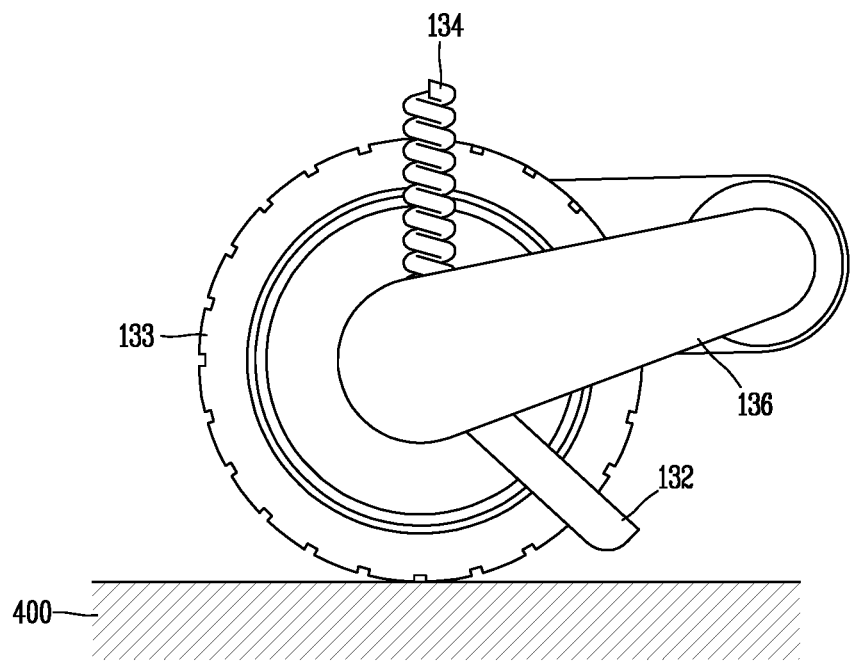
FIGS. 4A and 4B are conceptual views illustrating that a main wheel and a support of a moving robot escape from an arrested state according to an embodiment of the present disclosure.
Figure 4B:
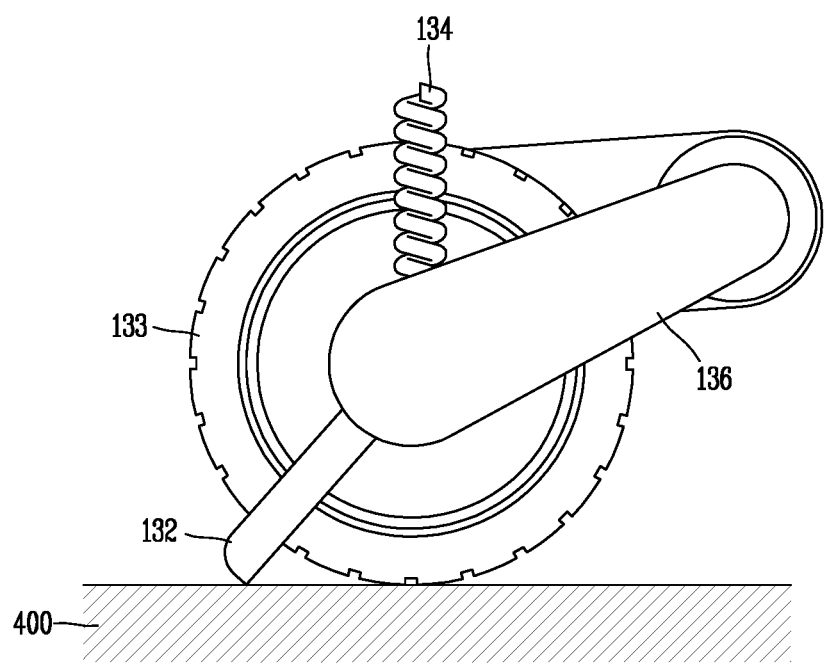

FIGS. 3A to 3C illustrate an embodiment related to an operation of the driving unit 130 in each of a traveling state, a completely arrested state, and an idle rotation state of a moving robot according to an embodiment of the present disclosure. Referring to FIG. 3A, when the moving robot normally operates, the leg member 132 may be substantially fixed to the main body of the moving robot, rather than being rotated with the driving shaft. A bearing may be provided between the leg member 132 and the driving shaft, and when the leg member 132 is not coupled to a first coupling member or a second coupling member, the leg member 132 may run idle with respect to the driving shaft. Also, when the moving robot normally operates, the elastic member 135 may maintain a predetermined length.

When the moving robot normally operates, the elastic member 135 may maintain a predetermined length such that a distance between one surface of the leg member 132 and one surface of the gear unit 136 is maintained as a first reference distance d1. In this manner, when torque applied to the driving shaft and a torsion force of the elastic member 135 are balanced, a length of the elastic member 135 may be maintained. Although not shown in FIG. 3A, when the moving robot is stationary, the motor 131 may be in an OFF state, and thus, the elastic member 135 may be maintained in a state of free length.

Referring to FIG. 3B, when the main wheel of the moving robot idly rotates, a length of the elastic member 135 may be increased. When the main wheel 133 enters an idle rotation state, external force or torque applied to the main wheel 133 is reduced and a compressed elastic member 135 may be extended according to the change. When the main wheel 133 idly rotates, a length of the elastic member 135 may be increased.

When the length of the elastic member 135 is increased and the distance between one surface of the leg member 132 and one surface of the gear unit 136 is equal to or greater than a second reference distance, the leg member 132 may be coupled to the first coupling member so as to be fastened to the main wheel 133. Conversely, referring to FIG. 3C, when the main wheel of the moving robot is arrested by an obstacle, a length of the elastic member 135 may be reduced.

In detail, when the main wheel 133 is arrested by an obstacle, an external force or torque applied to the main wheel 133 may be increased, and thus, torque applied to the driving shaft of the main wheel 133 may also be increased. Thus, torque applied to the elastic member 135 may be changed and the elastic member 135 may be further contracted according to the change. When the main wheel 133 is arrested by an obstacle, the length of the elastic member 135 may be reduced.

When the length of the elastic member 135 is reduced so a distance between one surface of the leg member 132 and one surface of the gear unit 136 is equal to or smaller than a third reference distance, the leg member 132 may be coupled to a second coupling member and fastened to the driving shaft of the gear unit. According to the aforementioned embodiment, since a rough area traveling performance is enhanced by adding a simple device to the driving unit without attaching a separate sensor to the robot, traveling performance of the robot may be remarkably enhanced at low cost.

Since a power transmission unit may be improved and addition of a mechanical part is minimized in an existing cleaning robot mechanism, a mechanical part improvement design process may be simplified to increase a possibility of commercialization and shorten a development period of an existing cleaning robot. Also, since an additional driver is not attached, additional power consumption may be minimized and an arrested situation may be escaped.

The moving robot according to the present disclosure may have a sensor to sense information related to torque applied to the driving unit. The controller 180 of the moving robot may control the driving unit 130 on the basis of the information sensed by the sensor. The controller 180 may change a length of the elastic member on the basis of the information related to torque applied to the driving unit.

When torque applied to the driving unit 130 is equal to or greater than a reference torque value, the controller 180 may increase a length of the elastic member 135 to couple the leg member 132 to the main wheel 133. When torque applied to the driving unit 130 is smaller than the reference torque value, the controller 180 may decrease a length of the elastic member 135 to couple the leg member 132 to a portion of the gear unit 136.

Figure 5:
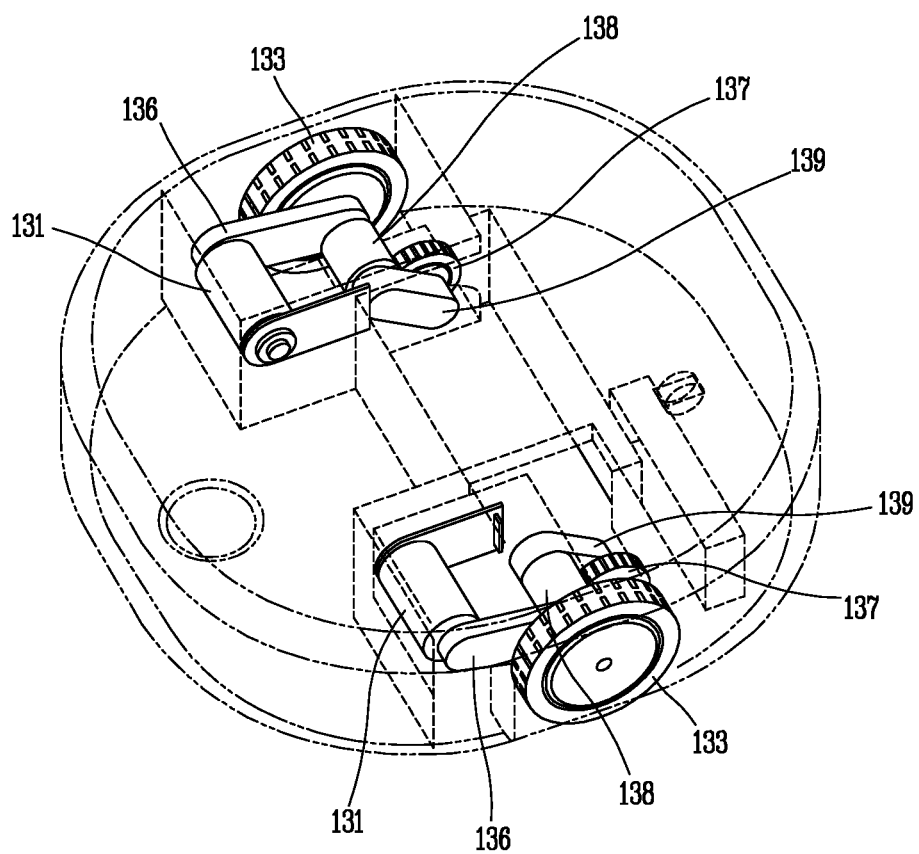
FIG. 5 is a conceptual view of a moving robot according to another embodiment of the present disclosure.

A moving robot according to another embodiment of the present disclosure will be described with reference to FIG. 5. Referring to FIG. 5, the driving unit 130 may include at least one of the main wheel 133, the gear unit 136, a clutch member (or clutch) 138, and an auxiliary shaft member (or auxiliary shaft) 139.

As illustrated in FIG. 5, the clutch member 138 may be connected to the auxiliary wheel 137 and the gear unit 136, and transfer a driving force from the motor 131 to the auxiliary wheel 137. The clutch member 138 may be a magnetic clutch. The magnetic clutch may include a solenoid and transfer a driving force to the auxiliary wheel 137 using a magnetic force generated in the solenoid.

Alternatively, the clutch member 138 may receive a control signal related to an operation of the clutch member 138 from the controller 180. The clutch member 138 may distribute a power from the main wheel to the auxiliary wheel 137. When the clutch member 138 is in an ON state, the clutch member 138 may be rotatable and change an installation position of the auxiliary wheel 138

Figure 6A:
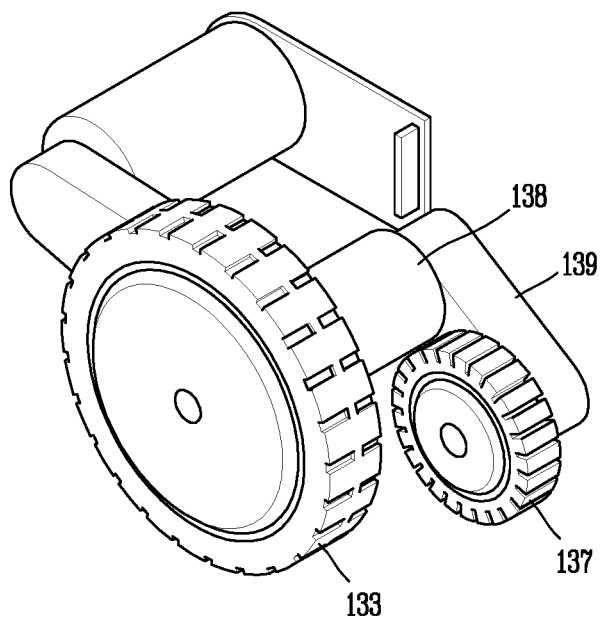
FIGS. 6A and 6B are conceptual views illustrating a driving unit including a main wheel and an auxiliary wheel included in the moving robot illustrated in FIG. 5.
Figure 7:
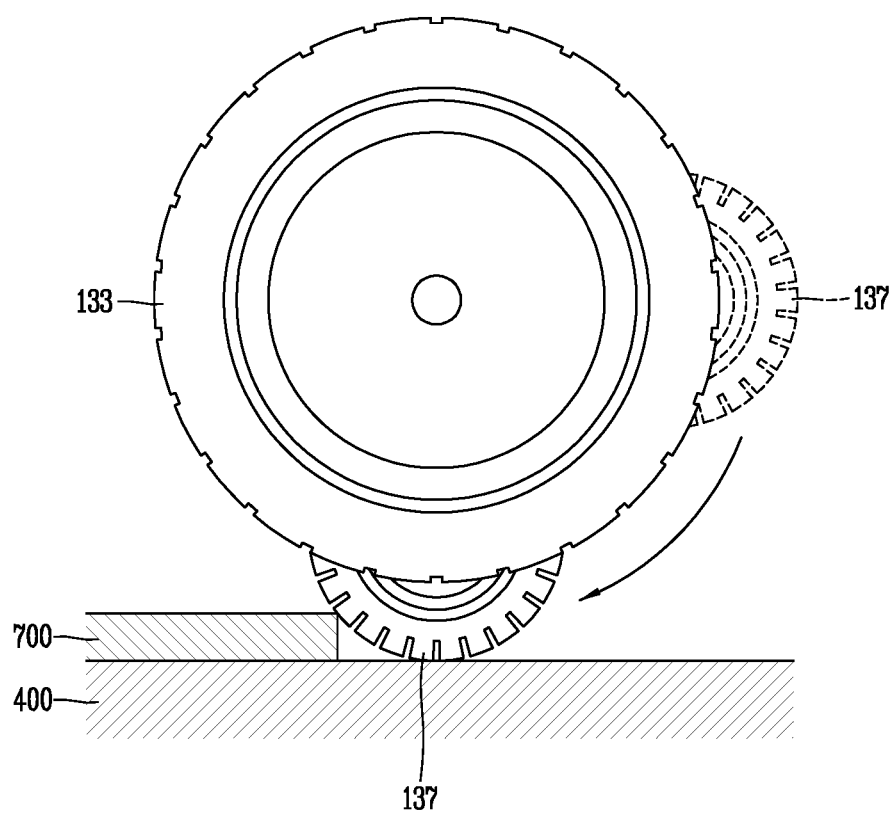
FIG. 7 is a side view of the driving unit including a main wheel and an auxiliary wheel illustrated in FIGS. 6A and 6B.

As illustrated in FIG. 6A, when the moving robot is normally traveling, the clutch member 138 may be turned off and the auxiliary wheel 137 may not contact a floor (or a ground) or an obstacle. Referring to a portion indicated by the dotted line of FIG. 7, when the clutch member 138 is in an OFF state, the auxiliary wheel 137 may be in a position in which the auxiliary wheel 137 is not in contact with the floor or an obstacle.

Figure 6B:
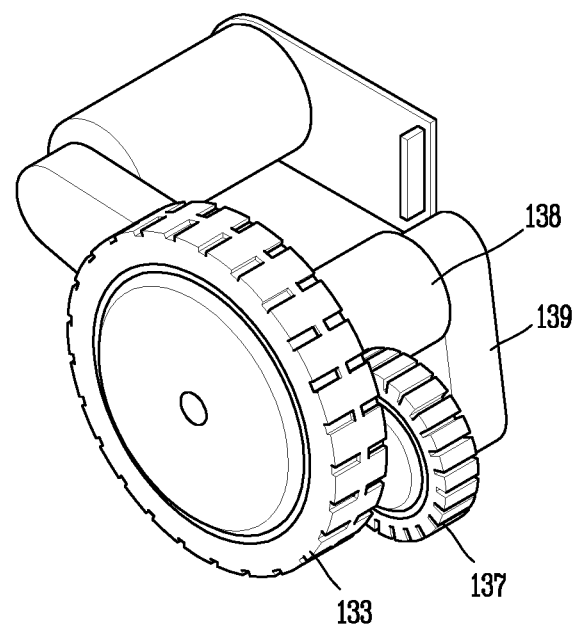

As illustrated in FIG. 6B, when the main wheel 133 of the moving robot idly rotates or is completely arrested by an obstacle, the clutch member 138 is turned on and the auxiliary wheel 137 may be in contact with the floor or the obstacle. Referring to a portion indicated by the solid line of FIG. 7, when the clutch member 138 is in an ON state, the auxiliary wheel 137 may be in a position in which it is in contact with the floor or the obstacle.

The controller 180 may control an operation of the clutch member 138 on the basis of information related to the obstacle. The information related to the obstacle may include a distance between the obstacle and the main body, a height of the obstacle, a sloped surface, a shape, a surface, and the like.

For example, when a height of the obstacle placed in a moving direction of the robot is equal or greater than a predetermined height value, the controller 180 may control the driving unit 130 to turn on the clutch member 138 to enable the auxiliary wheel 137 to be in contact with the obstacle.

Also, referring to FIGS. 6A and 6B, surfaces of the main wheel and the auxiliary wheel may have different shapes. A frictional force formed by the shape of the surface of the auxiliary wheel may be higher than a frictional force formed by the shape of the surface of the main wheel. For example, the surface of the auxiliary wheel may have a spoke shape.

According to an embodiment of the present disclosure, when at least one of a plurality of wheels idly rotates while the robot is passing through a surface having various conditions, the robot may escape from the idle rotation state using a driving force independently of the main wheel. Also, according to an embodiment of the present disclosure, when at least one of a plurality of wheels is arrested by an obstacle while the robot is passing through a bottom surface having various conditions, the robot may escape from the arrested state using a driving force independently of the main wheel.

Also, according to an embodiment of the present disclosure, since a rough area moving performance may be enhanced by adding a simple device to the driving unit without attaching a separate sensor to the robot, moving performance of the robot may be significantly enhanced at low cost. Also, according to an embodiment of the present disclosure, the robot having wheels may easily move over a rough area. Also, according to an embodiment of the present disclosure, when a cleaning area is a rough area, even when an obstacle is present in the cleaning area, cleaning efficiency of the robot may be enhanced.

A moving robot or a cleaner performing autonomous traveling may include: a main body; a driving unit moving the main body; and a cleaning unit performing cleaning on a cleaning area in which the main body is positioned, wherein the driving unit includes: a main wheel; a motor generating a driving force; a gear unit connected to the main wheel and the motor and transferring the driving force from the motor to the main wheel; and a leg member disposed on a shaft connecting the main wheel and the gear unit and providing thrust independently of the main wheel.

The leg member according to the present disclosure may have a bar shape, and when the main wheel idly rotates or when the main wheel is completely arrested by an obstacle or is in a deadlock state, the leg member provides thrust independently of the main wheel such that the moving robot is recovered to a normal state. That is, in a case in which the main wheel of the moving robot idly rotates or in a case in which the main wheel is completely arrested by an obstacle or is in a deadlock state, the leg member may spur to move on the obstacle or a floor surface such that the main body of the moving robot escapes from the idly rotated state, the completely arrested state, or the deadlocked state.

The leg member may have a bar shape, a length of the leg member may be greater than a radius of the main wheel, and when the main wheel idly rotates or is arrested by an obstacle, the leg member may rotate. The driving unit may further include an elastic member disposed between the leg member and the gear unit, and a length of the elastic member may be changed according to torque applied to the main wheel.

When the main wheel idly rotates, a length of the elastic member may be increased to cause the leg member and the main wheel to be coupled. The driving unit may further include: a first coupling member coupling the main wheel and the leg member.

When the main wheel is arrested by an obstacle, a length of the elastic member may be reduced and coupled to a portion of the gear unit and the leg member. The driving unit may further include: a second coupling unit coupling a portion of the gear unit and the leg member.

The moving robot or the cleaner may further include: a sensor sensing information related to torque applied to the driving unit; and a controller controlling the driving unit on the basis of the information sensed by the sensor. The controller may change a length of the elastic member on the basis of information sensed by the sensor.

When the torque is equal to or greater than a reference torque value, the controller may increase a length of the elastic member to couple the leg member to the main wheel. When the torque is smaller than the reference torque value, the controller may decrease a length of the elastic member to couple the leg member to the gear unit.

A moving robot or a cleaner performing autonomous traveling may include: a main body; a driving unit moving the main body; a cleaning unit performing cleaning on a cleaning area in which the main body is positioned; and a controller controlling an operation of the driving unit and the cleaning unit, wherein the driving unit includes: a main wheel, an auxiliary wheel, a motor generating a driving force, a gear unit connected to the main wheel and the motor and transferring the driving force from the motor to the main wheel, a clutch member connected to the gear unit and transferring the driving force from the motor to the auxiliary wheel, and an auxiliary shaft member connected between the clutch member and the auxiliary wheel, wherein the controller changes an installation position of the auxiliary wheel according to a state of the driving unit.

The clutch member may distribute a driving force transferred to the main wheel to the auxiliary wheel. The moving robot or the cleaner may further include: a sensor sensing information related to an obstacle, wherein the controller controls the driving unit such that the auxiliary wheel is in contact with the obstacle, on the basis of information sensed by the sensor.

According to an embodiment of the present disclosure, when at least one of a plurality of wheels idly rotates while the robot is passing through a bottom surface having various conditions, the robot may escape from the idle rotation state using a driving force independently of the main wheel. Also, according to an embodiment of the present disclosure, when at least one of a plurality of wheels is arrested by an obstacle while the robot is passing through a bottom surface having various conditions, the robot may escape from the arrested state using a driving force independently of the main wheel.

Also, according to an embodiment of the present disclosure, since a rough area moving performance may be enhanced by adding a simple device to the driving unit without attaching a separate sensor to the robot, moving performance of the robot may be significantly enhanced at low cost. Also, according to an embodiment of the present disclosure, the robot having wheels may easily move over a rough area.

Also, according to an embodiment of the present disclosure, when a cleaning area is a rough area, even when an obstacle is present in the cleaning area, cleaning efficiency of the robot may be enhanced. Also, according to an embodiment of the present disclosure, since the robot can pass through an obstacle without a sub-wheel unlike the related art robot, manufacturing cost and weight of the robot may be reduced and power efficiency of the robot may be increased, compared with the related art robot.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner performing automatic traveling, the cleaner comprising:
   a main body;
   a drive assembly to move the main body;
   a sensor to sense information related to torque applied to the drive assembly;
   a controller to control the drive assembly on the basis of the information sensed by the sensor; and
   a cleaner head to clean a cleaning area,
   wherein the drive assembly includes:
      a main wheel;
      a motor generating a driving force;
      a gear box connected to the main wheel and the motor and transferring the driving force from the motor to the main wheel; and
      a leg provided on a shaft connecting the main wheel and the gear box and configured to engage and rotate with either the main wheel or the gear box, wherein the leg has a bar shape, a length of the leg is greater than a radius of the main wheel, and when the main wheel idly rotates or is stopped by an obstacle, the leg rotates.

2. The cleaner of claim 1, wherein the drive assembly further includes a first spring provided between the leg and the gear box, and a length of the first spring is changed according to the torque applied to the main wheel.

3. The cleaner of claim 2, wherein when the main wheel idly rotates, the length of the first spring is increased to cause the leg and the main wheel to be coupled.

4. The cleaner of claim 3, wherein the drive assembly further includes:
   a first coupler coupling the main wheel and the leg.

5. The cleaner of claim 2, wherein when the main wheel is stopped by the obstacle, the length of the first spring is reduced and coupled to a portion of the gear box and the leg.

6. The cleaner of claim 5, wherein the drive assembly further includes: a second coupler coupling the portion of the gear box and the leg.

7. The cleaner of claim 1, wherein the controller changes a length of the first spring on the basis of information sensed by the sensor.

8. The cleaner of claim 7, wherein when the torque is equal to or greater than a reference torque value, the controller increases the length of the first spring to couple the leg to the main wheel.

9. The cleaner of claim 7, wherein when the torque is smaller than the reference torque value, the controller decreases the length of the first spring to couple the leg to the gear box.

10. A cleaner performing automatic traveling, the cleaner comprising:
    a main body;
    a drive assembly to move the main body;
    a sensor to sense information related to torque applied to the drive assembly; and
    a controller to control the drive assembly on the basis of the information sensed by the sensor; and
    a cleaner head to clean a cleaning area,
    wherein the drive assembly includes:
       a main wheel;
       a motor generating a driving force;
       a gear box connected to the main wheel and the motor and transferring the driving force from the motor to the main wheel; and
       a leg provided on a shaft connecting the main wheel and the gear box and configured to engage and rotate with either the main wheel or the gear box, wherein the drive assembly further includes a first spring provided between the leg and the gear box, and a length of the first spring is changed according to the torque applied to the main wheel, wherein when the main wheel idly rotates, the length of the first spring is increased to cause the leg and the main wheel to be coupled, and wherein when the main wheel is stopped by an obstacle, the length of the first spring is reduced and coupled to a portion of the gear box and the leg.

11. The cleaner of claim 10, wherein the leg has a bar shape, a length of the leg is greater than a radius of the main wheel, and when the main wheel idly rotates or is stopped by the obstacle, the leg rotates.

* * * * *